UNITED STATES PATENT OFFICE.

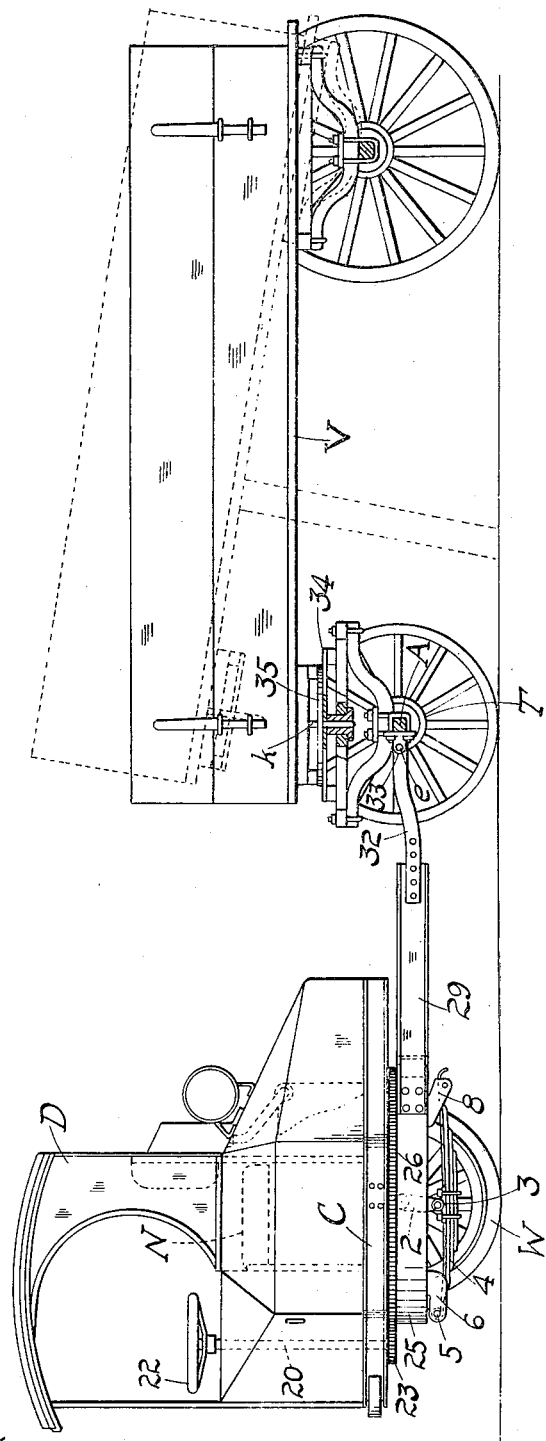

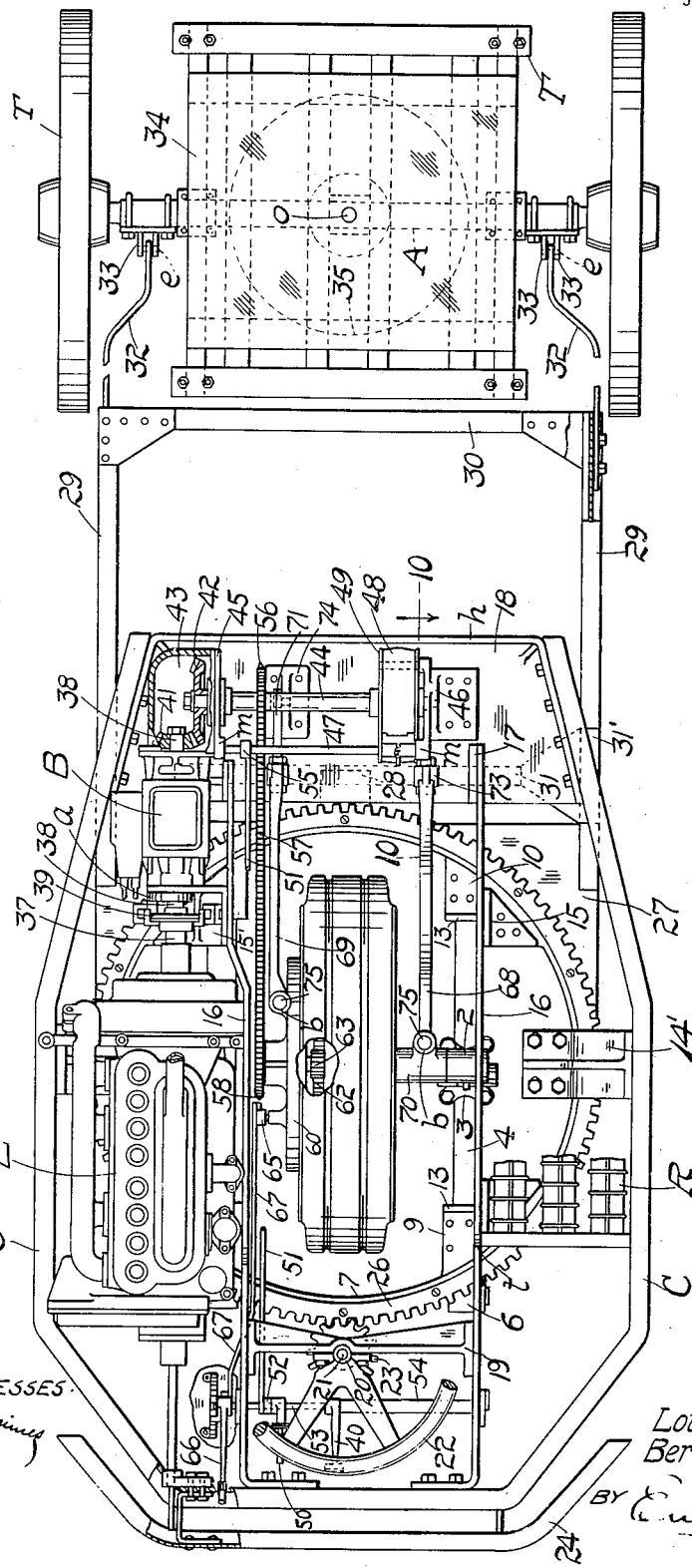

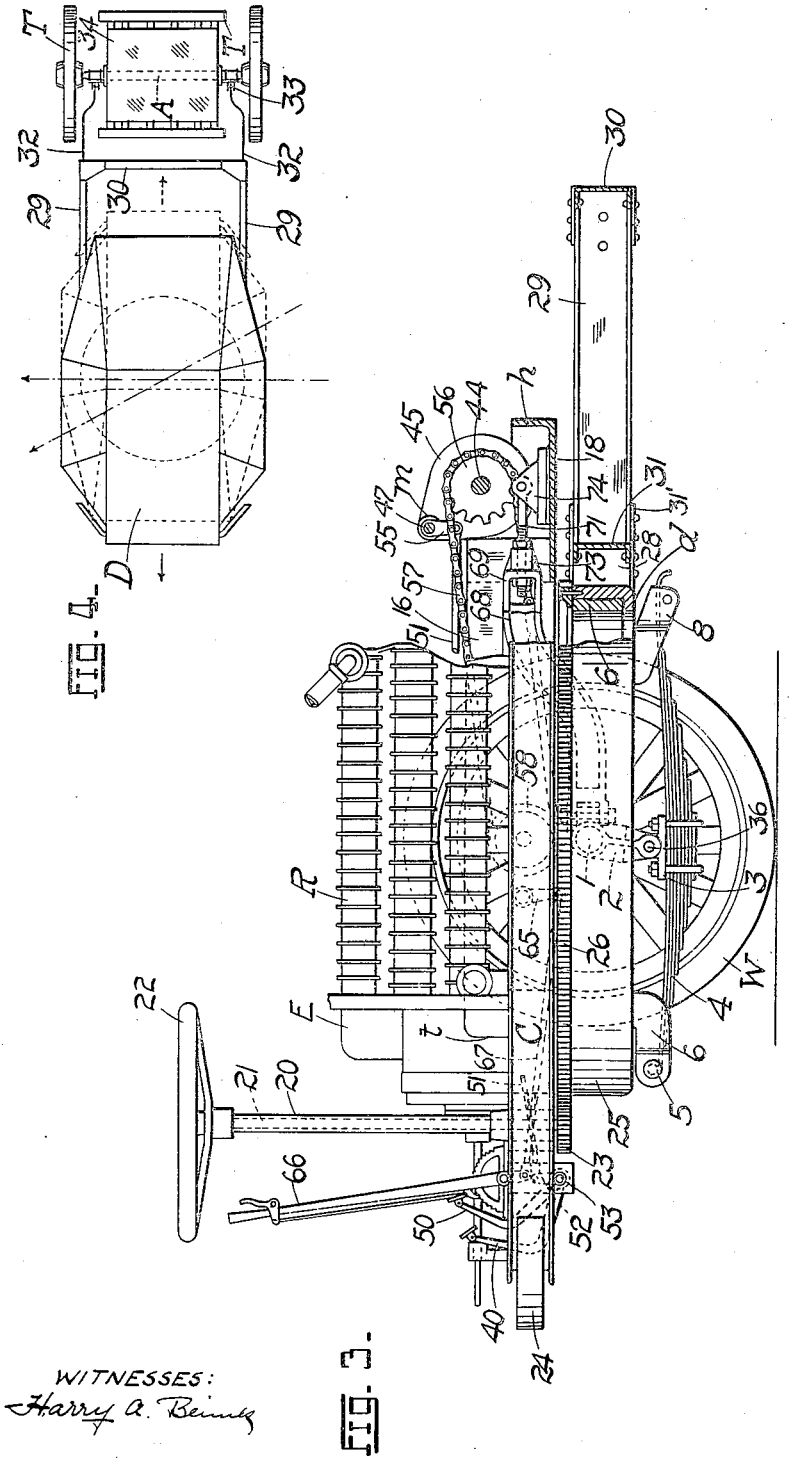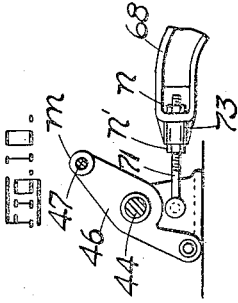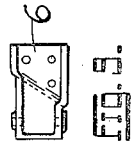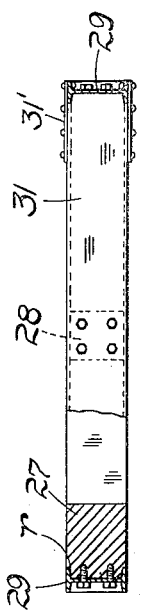

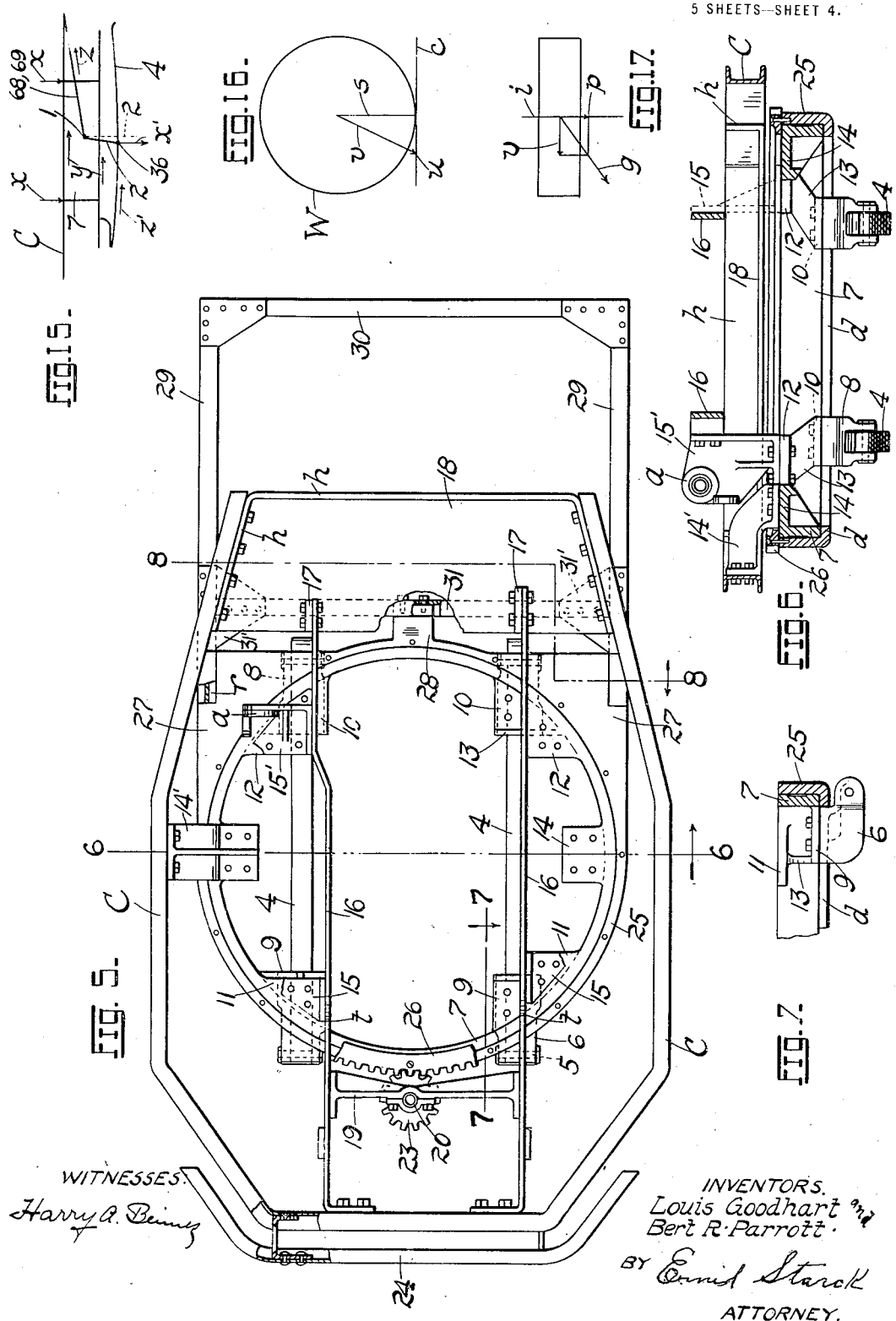

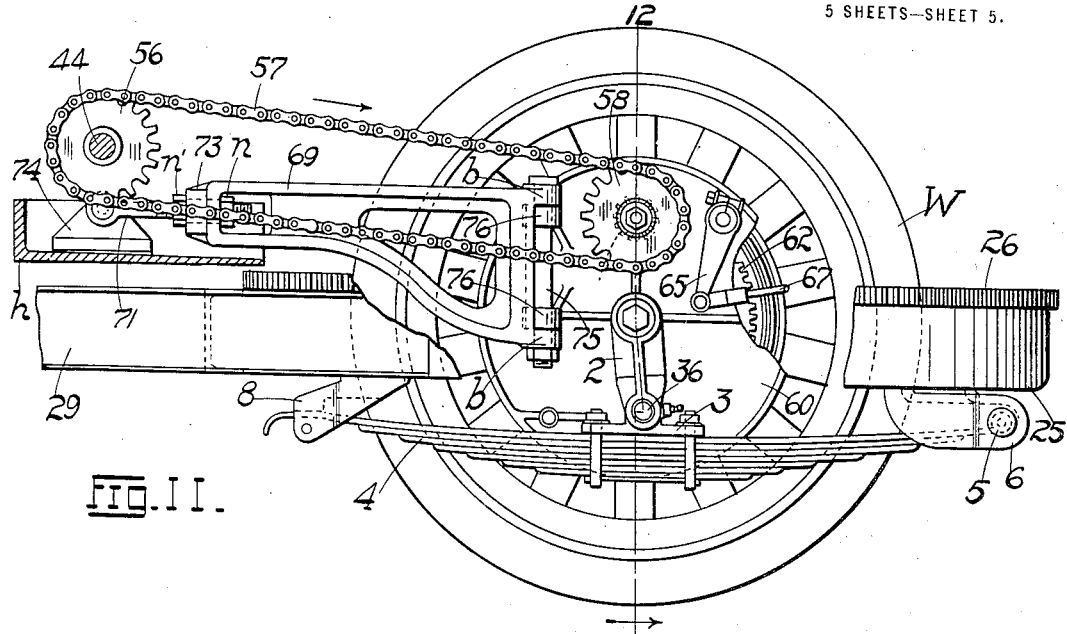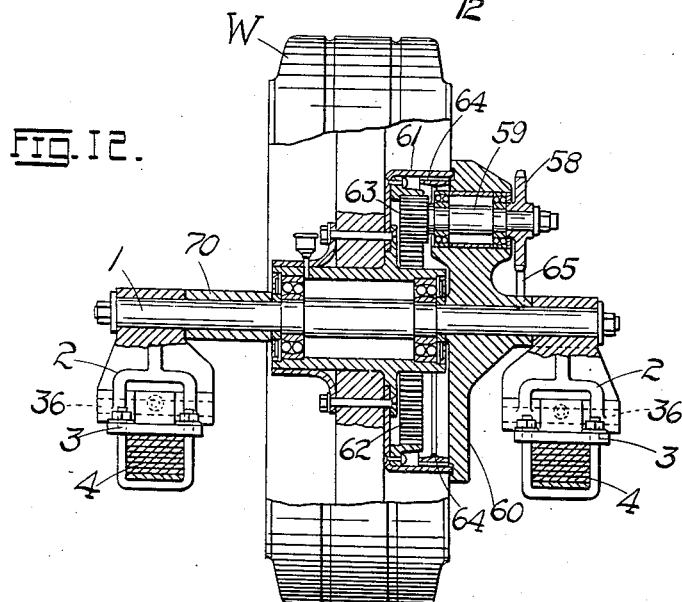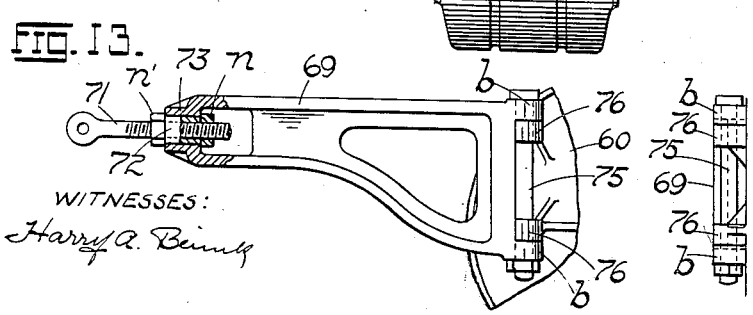

LOUIS GOODHART AND BERT R. PARROTT, OF ST. LOUIS, MISSOURI, ASSIGNORS TO ONE WHEEL TRUCK COMPANY, OF ST. LOUIS, MISSOURI, A CORPORATION OF MISSOURI.

TRACTOR.

1,325,633.     Specification of Letters Patent.     Patented Dec. 23, 1919.

Application filed December 18, 1917, Serial No. 207,673. Renewed October 22, 1919. Serial No. 332,575.

*To all whom it may concern:*

Be it known that we, LOUIS GOODHART and BERT R. PARROTT, citizens of the United States, residing at St. Louis, State of Missouri, have invented certain new and useful Improvements in Tractors, of which the following is a full, clear, and exact description, reference being had to the accompanying drawings, forming a part hereof.

The present invention is directed to tractors or motor-trucks of the type having a single front driving or traction wheel. As well understood in the art this type of tractor may or may not be equipped with rear running wheels; but where rear wheels are employed these are generally two in number, forming with the front wheel a three-wheeled tractor. It is with this specific form of tractor that our invention is in the main concerned though obviously, as presently to be seen, not necessarily restricted thereto. Where the invention is applied to three-wheeled tractors, one of the objects sought is to utilize the rear wheels for the double purpose of supporting the rear end of the draft-frame of the tractor, and to serve as the front supporting wheels or truck for any wheeled (or other) vehicle which may be coupled to and drawn by the tractor. The tractor may however be coupled to any independent implement or wheeled vehicle not depending for partial support on the rear wheels of the tractor, said tractor constituting a complete motor-truck to which any object, implement, or vehicle can be attached for the purpose of being moved from one place to another. A further object of our invention is to provide a tractor in which the center of gravity of the load carried by the driving wheel shall be as low as possible, the load being moreover so evenly distributed about the central plane of rotation of the driving wheel as to make the tractor stable and free from any material tendency to overturn in passing across ordinary grades encountered in practice. A further object is to provide a tractor in which any and all torsional strains resulting either from the action of the driving mechanism, or by reason of a sudden arrest of the machine encountering an obstruction, are taken care of by structural elements properly disposed to take up these strains; to provide a tractor which shall be practically free from rattling of any of its component parts; to provide a tractor in which the lowest point of support of the load imposed on the driving wheel shall be maintained both below, and slightly in advance of the rotation axis of the wheel (that is to say in advance of a vertical transverse plane through said axis), for purposes of stabilization, and the taking care of the torque due to sudden impact against an obstruction; to provide a tractor which shall be compact, one capable of making sharp turns or changing its direction of travel in a limited clearance space; one readily responsive to the manipulations of the driver; one having a wide range of adaptability; and one possessing further and other advantages better apparent from the following detailed description in connection with the accompanying drawings in which—

Figure 1 represents a side elevation of our tractor with an independent vehicle or trailer attached thereto; Fig. 2 is a top plan of the tractor with parts broken away; Fig. 3 is an enlarged side elevational view of the tractor with the cab and rear truck thereof removed, and other parts broken away; Fig. 4 is a top plan of the tractor on a smaller scale with the cab in position, and also showing in dotted outline the carriage turned one hundred and eighty (180) degrees from its normal pulling position, or into position for backing the trailer; Fig. 5 is a top plan of the carriage frame and draft-frame assembled; Fig. 6 is a vertical cross-section on the line 6—6 of Fig. 5; Fig. 7 is a longitudinal sectional detail on the line 7—7 of Fig. 5; Fig. 8 is a vertical cross-section of the draft-frame only, on the line 8—8 of Fig. 5; Fig. 9 is a bottom plan view of the front spring pad or supporting bracket; Fig. 10 is an inside elevational view of the shoe or bracket supporting one end of the rock-shaft controlling the service brake, the parts cut being on the longitudinal section line 10—10 of Fig. 2; Fig. 11 is an enlarged vertical longitudinal section taken adjacent to and just outside of the sprocket drive chain, with parts broken away; Fig. 12 is a vertical cross-section on the line 12—12 of Fig. 11; Fig. 13 is a detached side elevation of the tension or torque member leading from the cap plate covering the driving gear on the traction wheel; Fig. 14 is a front end view of said torque member; Fig. 15 is a diagram showing the strains through the tension members, carriage frame and supporting springs; Fig. 16 is an elevational diagram of the forces tending to overturn the tractor when the center of gravity of the load is shifted outside and in front of the supporting base of the traction wheel; and Fig. 17 is a diagrammatic plan of the forces tending to overturn the tractor when the center of gravity of the load has been shifted outside and in front and to one side, of the base of support of the traction wheel.

The tractor herein may be said to combine three distinct members properly assembled to fulfil their respective functions, said members comprising (1) a carriage or propelling and steering member, (2) a draft member, and (3) a rear truck for permanently maintaining the draft member in service position, and itself serving as a front truck for any vehicle which may be attached thereto. In the present embodiment of our invention the carriage comprises a driving or traction wheel, a carriage frame, a motor or engine, suitable transmission and driving gear, steering mechanism, the seat for the driver, and the various instrumentalities usually entering into the make-up of any carriage or self-propelled vehicle irrespective and independent of its service as a tractor. It thus follows that the entire weight of the carriage is imposed on the driving wheel. In addition, the driving wheel supports a portion of the weight of the draft-frame or draft member, another portion of the weight of said member being supported by the rear truck or wheels permanently coupled to said member. Beginning our detailed description with the carriage, and referring to the drawings, W, represents the driving or traction wheel and 1 the axle thereof, as well understood in the art. As previously stated, one of the objects sought is to bring the point of support of the load as low as possible and normally slightly in advance of the rotation axis of the wheel. For this purpose we suspend from the opposite ends of the axle 1, suitable links or hangers 2, 2, the same being disposed at a slight incline to the vertical, the inclination being downward and forward from their points of support on the axle. To the lower forked ends of the links 2 are journaled the plates 3 which are in turn strapped or otherwise secured to the middle portions of the carriage-supporting springs 4, the front ends of the springs being pivotally anchored by means of pins 5 to the spring pads or brackets 6 secured to the rotatable carriage-ring 7, the rear ends of the springs passing loosely through, or floating in the brackets or spring pads 8 likewise secured to the carriage-ring. In the present embodiment of our invention the pads 6 are preferably bolted to the front bottom lugs or shelves 9 cast on the ring 7, the pads 8 being bolted to the rear bottom lugs or shelves 10 cast on said ring. Likewise cast on the ring 7 are the front upper shelves or lugs 11, and the rear upper shelves 12, the lugs 9 and 11, and 10 and 12 being connected by stiffening webs 13 as shown. In addition to the above, the ring 7 has cast thereon the top side lugs or shelves 14. Bolted to the shelves 14 are brackets 14' to which are secured the side members of the carriage-frame C. Bolted to the shelves 11 and 12 are angle brackets 15 one of said brackets designated by 15' being provided with a hollow boss $a$ forming a bearing for the transmission shaft of the engine, to be presently referred to. To the inner faces of the vertical legs of the several brackets 15 15' are bolted or otherwise secured the longitudinal inner bars 16 of the carriage frame C, the front ends of said bars being bent inwardly and secured to the front cross member of said frame as shown in Fig. 2. The rear ends of the bars 16 are fastened to brackets 17 cast with the rear plate 18 of the carriage frame, said plate being provided with a flange $h$ the side portions whereof are bolted to the side channels of said frame. The forward ends of the bars 16 are formed with offsets $t$ so as to depress the same to the level of the front cross channel member of the carriage frame to which the bent terminals of the bars are directly secured. Spanning the space between the members 16, 16, in front of the ring 7 is a cross-bar 19 which forms a support for the upright steering staff 20, the steering rod 21 of which is provided with the usual steering wheel 22, the lower terminal of the steering rod carrying a pinion 23 as shown. The front of the carriage frame is provided with a buffer 24.

The carriage ring 7 is loosely encompassed by the front ring 25 of the draft frame, said ring being provided with a bottom inwardly turned integral flange $d$ and an upper gear ring 26 screwed or otherwise secured thereto, the said ring projecting beyond the inner face of the carriage ring 7, a distance substantially equal to that of the flange $d$ whereby the carriage ring is confined between the flange and said projecting or overhanging portion of the gear ring (Fig. 6). The teeth of the gear ring project outwardly beyond the outer face of the ring 25 and are in mesh with the pinion 23 on the steering rod. Formed integrally with the ring 25 at diametrically opposite points rearward of the transverse diameter or axis of the ring are cheeks 27; and at the inner terminal of the longitudinal diameter said ring 25 is provided with a lug or tongue 28. The sides of the cheeks 27 are rabbeted or recessed, the recesses $r$ receiving the adjacent flanges of suitable I-beams 29 the rear ends of which are connected by a terminal rear cross member 30. The tongue 28 is secured to a cross-bar 31 whose terminals are connected by means of gussets 31' to the front ends of the side or longitudinal I-beams 29; the parts 25, 27, 28, 29, 30 and 31 collectively constituting the draft-frame of the tractor. Leading rearwardly from the I-beams 29 are straps or coupling bars 32 the rear terminals of which are pivotally secured by pins $e$ between the lugs 33, 33, carried by the axle A of the rear truck T, said truck being provided with a platform 34 serving as a support for the fifth wheel 35 of the trailer or vehicle V intended to be drawn by the tractor. The platform 34 is provided with the usual opening or socket $o$ for the king bolt $k$ by which a fifth wheel is usually swiveled to its truck. The rear truck T thus forms a front truck for the independent vehicle intended to be attached to the tractor, said truck maintaining the draft frame of the tractor at all times in service position. The pins $e$ serve to hinge or flexibly connect the rear truck T to the straps 32, the joint thus formed permitting the tractor to pull the rear vehicle V along any grades without a strain on the straps, the king-bolt $k$ permitting the drawing of the rear vehicle around curves in the usual way. The straps 32 are preferably extended rearward a short distance beyond the rear end of the draft-frame to leave a working space between the rear truck T and draft-frame for any desired purpose. The weight of the draft-frame is practically divided between the carriage ring 7 and the rear truck T, the front end of the frame being supported by said carriage ring and the rear end by the rear truck; and the combined weight of the carriage and draft-frame being substantially balanced about the common axis of the journal pins 36 to which the plates 3 carrying the carriage-supporting springs 4 are attached.

As previously stated, the carriage frame supports the bulk of the weight of the machine, and in the present embodiment of our invention the said frame carries the motor or engine E, the radiator R, the transmission case B, the cab D, the driver's seat N, and the driving and steering mechanism to be now described. The said mechanism is herein shown more or less conventionally, not being claimed per se. Interposed between the engine or motor shaft 37 and the shaft 38 of the transmission (which shaft 38 as previously stated has a bearing in the boss $a$ of the bracket 15') is a clutch member 39 operated from the foot clutch-lever 40 by intermediate connections removed for the sake of clearness and well understood in the art. The rear end of the transmission shaft carries a bevel pinion 41 meshing with a bevel gear wheel 42 in the gear case 43, said gear 42 being secured at one end of the countershaft 44 at the rear end of the carriage frame, said shaft being supported by the cover plate 45 of the gear case and by the bracket or shoe 46, the said members 45 and 46 being formed with transversely alining bosses $m$ for the support of the transverse rock-shaft 47 which controls the cam by which the brake-band 48 is applied to the brake drum 49 on the shaft 44. The shaft 47 is actuated from the brake pedal lever 50 through the instrumentality of a link 51 coupled to the oscillating arm 52 on the rock-shaft 53 (traversing the rock-sleeve 54 to which the lever 40 is secured) and to the arm 55 on the rock-shaft 47. The parts just described constitute the service brake mechanism and are shown more or less conventionally because well understood in the art. Mounted on the counter-shaft 44 is a sprocket wheel 56 operating a sprocket chain 57 disposed longitudinally of the machine on one side of the traction wheel W, the said chain passing over a similar sprocket wheel 58 at the outer end of a spindle or short drive shaft 59 mounted in the cap plate or cover 60 passed over the axle 1 and protecting the interior of the cylindrical housing or drum 61 bolted to the wheel. Mounted in the housing 61 is a circular interiorly toothed gear ring 62 with which meshes a pinion 63 on the inner end of the spindle 59. Between the ring 62 and the cap plate 60 is a brake band 64 the ends of which are controlled by the usual cam or equivalent device (not shown) actuated by an arm 65 which in turn is controlled from the emergency brake lever 66 through intermediate link connections 67 or their equivalent. The aforesaid driving gear and emergency brake mechanism just described are not claimed herein per se because well understood in the art; and the same are shown more or less conventionally and without any attempt to illustrate details.

Since the weight of the carriage and its load is suspended from the normally inclined links or hangers 2, the tendency of said links is to swing to a vertical position under said weight as clearly obvious from the drawings. In other words the carriage tends to swing rearwardly. To prevent this we provide the torque or tension members 68 and 69 respectively, the member 68 having its forward end pivotally secured to a sleeve 70 passed over the axle 1 between one side of the traction wheel and the adjacent link 2, the rear end of said member 68 being coupled to a screw link 71 hinged at the rear end to the shoe or bracket 46, the threaded portion of the link being equipped with adjusting nuts $n$, $n'$, respectively engaging the inner face of the terminal wall of the tension member and the boss 73 formed with said wall (Fig. 10). In the same manner the rear end of the tension member 69 is coupled to a similar screw-link 71 hinged to a shoe or bracket 74 on the plate 18 of the carriage frame, said link being likewise provided with adjusting nuts n, n', respectively engaging the terminal wall and boss 73 of said member. The forward end of the member 69 (which by the way differs in general contour from the member 68) on the other hand is coupled by means of a bolt 75 to suitable lugs 76 on the cap plate 60, said lugs being perforated and in vertical alinement, the perforations registering with perforations in the lugs b of said member whereby the bolt is passed through the several perforations and the member secured to the plate. The front ends of the members 68, 69, are thus virtually secured to the axle of the driving wheel, said axle serving as an anchor, the connections thereto being made through the sleeve 70 and cap plate 60 respectively. Since the opposite ends of said members are secured to the carriage frame which, for reasons previously stated, tends to swing rearwardly (to bring the links 2 into vertical position) it is obvious that normally a pull will be exerted on said members and they will be in tension; and while said tension members serve to maintain the carriage frame in proper position they likewise serve as means for taking up the slack in the drive chain 57. When the slack in the chain becomes excessive the driver, by manipulating the nuts n, n', can lengthen out said tension members until the slack is taken out and the chain tightened. Of course in such adjustment the lengthening of the tension members has the effect of moving the driving wheel forward in the general plane of its rotation, and of pushing the rotation axis thereof toward a point directly over the pins 36 supporting the weight of the carriage; and with constant adjustments of that character the links 2 would not only assume a vertical position but might in fact slant in the opposite direction. By that time however the chain would have been tightened so often from frequent slackenings that a new chain would be substituted. In practice however it is better not to take up the slack of a chain to the point where the links 2 would be caused to pass beyond a vertical position, it being desirable to have them incline downwardly and forwardly whereby they may (by reason of the downward pull exerted upon them by the weight of the load suspended from them) exert a constant pull on the forward halves of the springs 4, the latter in turn pulling on the anchor pins 5, whereby the springs are kept from rattling while the tractor is running. Under normal service conditions therefore not only the members 68, and 69, but likewise the front halves of the springs 4 will be in tension. This results from the floating character of the rear ends of the springs as clearly apparent from the diagrammatic illustration in Fig. 15. By referring to said figure it will be observed that the weight of the carriage frame C and its ring 7 acts vertically downward as indicated by the arrows x, x, and x'; and since the lowest point of support 36 on the links 2 is to the left of the point of suspension 1 of said links, the horizontal component of the force of the weight tending to swing the links 2 to the right or to the dotted vertical position naturally causes the carriage C and ring 7 supported by said links to swing in a corresponding direction as shown by arrows y, y. This causes a tension to be imposed on the members 68, 69, as shown by the arrow z. The right hand terminals of the springs 4 being free to float or disconnected it follows that this same horizontal component pulls on the left hand anchored half of the springs thereby imposing tension thereon as shown by arrow z' and preventing any tendency to rattling when the vehicle is in service.

There is another advantage gained from attaching the carriage frame at a point forward of the vertical transverse plane through the rotation axis of the driving wheel. It was stated above that the weight of the carriage and its load was fairly well balanced about the common axis of the supporting pins 36, so that the center of gravity of the suspended mass would be substantially over (a little to the rear of) the axis of said pins; and since this point is to one side of the tangent of contact of the wheel W with the ground it follows that a sufficient disturbance especially when the tractor was running at high speed would shift the center of gravity (of the suspended mass) considerably ahead of the axis of rotation of the wheel or outside and forward of a vertical transverse plane through said tangent of contact. For illustration we can regard the tangent of contact as the base over which the center of gravity of the mass should be substantially permanently maintained to prevent the vehicle from any tendency to overturn, so that if the center of gravity is shifted forward outside of said base the body will tend to overturn in the same direction. Referring now to the diagrammatic illustrations in Figs. 16 and 17, let us suppose that the line c represents the plane of the surface traversed by the wheel W and that i represents the tangent line (in practice a surface) of support on said surface. Now, if the center of gravity of the mass is caused to be shifted forward of the vertical line s which is perpendicular to the tangent line i, so as to be vertically over a point represented by u at the lower end of the diagonal line v in Fig. 16 or at the outer terminal of the horizontal projection of said line v in Fig. 17, it follows that if the tractor for any reason suffers a jar or runs across a grade which at the same time will shift the center of gravity of the mass laterally or to a point on the tangent line *i* beyond the wheel, for example to a point directly over the point *p* in Fig. 17, then the tractor tending as it does to tilt forward and sidewise at the same time will tilt in a direction represented by the resultant of the two forces, that is to say it will tend to overturn in a direction represented by the diagonal line *g* in Fig. 17. This tendency to tilt catercorner instead of sidewise contributes materially to the stability of the tractor, such tendency being always inherent in the machine so long as the lowest point of support (36) of the mass is allowed to remain forward of the tangent line *i* (or supporting base of the mass). With the lowest point of support of the load as indicated any disturbance of the machine which would shift the center of gravity of the mass sidewise would ordinarily likewise shift it forward, so that the machine would tend to tilt sidewise and forward at the same time or catercorner. Since a catercorner or diagonal tilt could not as readily overturn the machine as would an outright side tilt, it follows that by the arrangement as described a maximum stability for the machine is assured. In the event that the driving wheel encounters an obstruction such as a large rock or anything else which may suddenly arrest the advance of the machine, the inertia of the carirage will obviously, under the circumstances, pitch the carriage forward so as to impose a compression strain on the torque members 68, 69, the said members bracing themselves against the axle of the wheel serving as an abutment. It follows therefore that under normal service conditions the members 68, 69, act as tension members, and under a sudden stoppage of the machine when the driving wheel encounters an obstruction they act as compression members or struts.

The operation scarcely requires description, but briefly stated is as follows: The motor or engine E being set in motion necessarily imparts rotation to the driving or traction wheel W through the gearing 41, 42, 44, 56, 57, 58, 59, 62 and 63 previously described, thereby propelling the carriage which draws with it the draft-frame (composed of the ring 25, beams 29, the member 30 and their necessary appurtenances) and truck T hinged thereto. By manipulating the steering wheel 22 rotation in either direction may be imparted to the pinion 23 secured to the steering rod 21. Since this pinion is in mesh with the teeth of the gear ring 26 on the ring 25 of the draft frame it follows that rotation of the pinion will cause it to traverse the teeth of the (relatively stationary) gear ring 26 and thus oscillate the carriage in a horizontal plane about a vertical central axis through the driving wheel, the axis of oscillation of the driving wheel obviously intersecting the axis of rotation of said wheel. Thus the carriage may be steered or oscillated any number of degrees horizontally and the tractor be caused to turn a corner or turn in a circle within a very small compass or limited space. The carriage may be turned horizontally a full three hundred and sixty (360) degrees. When swung around one hundred and eighty (180) degrees the front of the carriage will face the rear truck T and the trailer or other vehicle V, so that the said vehicle may now be pushed backward as obvious from the dotted position of the carriage shown in Fig. 4. It follows therefore that since the carriage has a horizontal sweep of a full circle, the trailer vehicle may be pulled or pushed in any desired direction.

No claim of course is herein made to the various independent instrumentalities entering into the organization of the structure. For example, no claim is made to the motor, driving gear, brake appliances and other well known expedients with which the skilled mechanic is perfectly familiar, the invention being restricted to the specific relations under which these and other instrumentalities coöperate to bring about the results and advantages previously pointed out and others which naturally suggest themselves but not specifically mentioned. Features shown but not alluded to are well understood in the art and require no description in the present connection. Obviously the details of construction may be departed from without in any wise affecting the nature or spirit of the invention. It will be seen by a reference to the drawings, that the carriage frame and rotatable ring 7 thereof are free to rotate in a horizontal plane disposed above the lowest points of support of the carriage (journal pins 36) said plane being in the plane of disposition of the gear ring 26 through which the said rotation is imparted and to which said rotation plane must necessarily be referred. This plane in the present embodiment of our invention is slightly above the axis of rotation of the driving wheel, but we do not wish to be understood as limiting ourselves to this position. It may be for example in the plane of said axis, or even higher than shown in the structure illustrated in the drawings, but always in the region of the rotation axis of the driving wheel so as to keep the center of gravity of the load as low as possible. The members 68, 69 as positioned are normally in tension for reasons stated, but were these members disposed on the opposite side of the axle from the position shown, so as to engage the front end of the carriage frame instead of being coupled to the rear end (as shown in the drawings) it is obvious that they would be normally under compression; and while such an arrangement would not be foreign to the scope of our present invention, yet, these members serve their purpose better as tension than as compression members, and are located to better advantage relatively to the drive chain 57, the tension of which they serve to regulate. We therefore prefer to have these members in tension rather than in compression under normal service conditions. The tractor is herein shown as coupled to one independent vehicle V; but it is obvious that any number of vehicles in turn coupled to the vehicle V and to one another by any suitable method may be pulled by the tractor. The main point is to provide means for pivotally mounting the front end of the first independent vehicle to the rear truck of the tractor as described, for in that case we can secure all the desired steering and turning movements without straining any of the parts.

It must not be supposed that the tendency of the tractor to overturn diagonally instead of transversely or squarely across the longitudinal axis of the machine is wholly due to the fact of the load being suspended from points in advance of the vertical transverse plane through the rotation axis of the driving wheel, as described and as illustrated diagrammatically in Fig. 17. This manner of suspension merely emphasizes said diagonal direction. The tractor will always tend to overturn diagonally even when, after successive adjustments of the tension members 68, 69, the links 2 have been caused to assume a truly vertical position, such tendency being due to the fact that the entire weight of the tractor (including carriage, draft-frame and rear truck T) is supported at three points marking the vertices of an isosceles triangle which constitutes the base of support for the tractor, these points being respectively the point of support of the traction wheel W at one end of the machine and the two points of support of the wheels of the rear truck T at the opposite end. The base of this triangle may be said to be the line connecting the points of contact of the rear truck wheels with the ground, the inclined sides of said triangle being the lines leading from said points of contact to the point of contact of the driving wheel with the ground. In the event that the center of gravity of the tractor passes outside of this triangle, or is shifted laterally for any reason beyond one of the inclined sides of said triangle, the tractor would still tend to overturn not in a direction transverse to the longitudinal axis thereof, but transverse to the inclined side of the triangle, or in other words in a diagonal direction as previously described. The suspension of the load however from points on links 2 inclined as shown in the drawings, tends to still further incline the direction in which the machine must overturn as a result of any lateral shifting of the center of gravity of its load beyond the supporting base thereof, as clearly apparent from Fig. 17 of the drawings. To insure the maximum degree of stability and reduce the danger of overturning of the tractor are among the objects sought by the present invention. To attain these not only should the load be suspended from the driving wheel, but the lowest point of support of the load thus suspended should be below and slightly in advance of the rotation axis of said wheel as herein fully explained. A suspension of the load insures a lowering of the center of gravity thereof which is alway essential where stability is the object sought. The rear truck T need not necessarily have two wheels. It may have one wheel or more than two wheels, the invention not being limited to a draft-frame having a two-wheeled truck. In fact in some cases the truck may be omitted altogether and in lieu thereof we may substitute some form of coupling for connecting the trailer to the tractor, the said coupling operating in conjunction with a suitable stabilizer for holding the draft-frame in service position, that is to say in operative position or position suitable for pulling the trailer or independent vehicle.

Having described our invention what we claim is:

1. In a tractor, a carriage frame rotatable about a fixed vertical axis, a driving wheel supporting said frame and oscillatable jointly therewith about said axis, a draft-frame loosely engaging the rotatable frame and extending rearward a suitable distance beyond the carriage-frame, an axle disposed crosswise of the draft-frame at the rear end thereof and coupled pivotally thereto, wheels carried by said axle and supporting a portion of the weight of the draft-frame, a platform on the axle between the wheels for the pivotal support of a fifth wheel of a trailer drawn by the tractor.

2. In a tractor of the character described, a carriage frame, a driving wheel therefor, means for suspending the load imposed on the wheel from the axis of the wheel, and means for maintaining the lowest point of support of said load below said axis and in hinged relation to the suspending means.

3. In a tractor of the character described, a carriage frame, a driving and steering wheel therefor, means for suspending the load imposed on the wheel from the axis of the wheel, and means for maintaining the lowest point of support of said load below said axis and in hinged relation to the suspending means.

4. In a tractor of the character described, a carriage frame, a driving and steering wheel therefor, means for suspending the load imposed on the wheel from the axis of the wheel, and means for maintaining the lowest point of support of said load below and slightly in advance of said axis.

5. In a tractor of the character described, a carriage frame, a driving and steering wheel therefor, means for suspending the load imposed on the wheel from the axis of the wheel, and means for maintaining the lowest points of support of said load below said axis and in a vertical transverse plane slightly in advance of said axis.

6. In a tractor of the character described, a rotary carriage frame, a ring secured thereto, and rotating in unison therewith, a driving wheel within the ring, an axle for the driving wheel, links suspended from the axle on opposite sides of the wheel, springs secured to the links at points below the axis of rotation of the wheel and extending forward and rearward of said axis, means for fixedly coupling the ends of the springs on one side of the rotation axis of the wheel to the ring, and maintaining the ends of said springs on the opposite side of said axis in movable or floating engagement with said ring, whereby the load imposed on the carriage frame is transmitted to the axle of the wheel through the ring, the springs and the links.

7. In a tractor of the character described, a rotary carriage frame, a ring secured thereto and rotating in unison therewith, a driving wheel in the ring, an axle for the wheel, links suspended from the axle on opposite sides of the wheel, springs secured to the links below the rotation axis of the wheel at points offset from a vertical transverse plane through said axis, said springs extending forward and rearward from their points of connection with the links, means for fixedly securing to the ring the ends of the springs on one side of the points of connection of the latter with the links, the opposite ends of the springs having freedom of movement relatively to the ring, whereby the portions of the springs between their fixed ends and their points of connection with the links will be under permanent tension imparted thereto by the load imposed on the carriage frame.

8. In a tractor of the character described, a rotary carriage frame, a driving wheel within the frame, an axle for said wheel, links suspended from said axle on opposite sides of the wheel and yieldingly coupled to said carriage frame, and means for adjusting the driving wheel in the general plane of rotation of the wheel.

9. In a tractor of the character described, a rotary carriage frame, a driving wheel within the frame, a drive chain for the wheel operating in a plane substantially parallel to the plane of rotation of the wheel, links suspended from points about the axis of rotation of the wheel on opposite sides of the wheel and yieldingly coupled to the carriage frame at points below said axis, and means on the carriage for adjusting the position of the wheel in the general plane of rotation thereof to take up the slack of the drive chain.

10. In a tractor of the character described, a combined driving and steering wheel, an axle therefor, a carriage suspended from said axle and having its lowest points of support journaled below the rotation axis of the wheel.

11. In a tractor of the character described, a combined driving and steering wheel, an axle therefor, a carriage loosely suspended from said axle and having its lowest points of support journaled below the rotation axis of the wheel.

12. In a tractor of the character described, a combined driving and steering wheel, an axle therefor, links freely suspended from the opposite ends of the axle and capable of oscillatory movement in planes parallel to the plane of rotation of the wheel, and a carriage frame encompassing said wheel and secured to the lower ends of the links.

13. In a tractor of the character described, a driving wheel, an axle therefor, links freely suspended from the axle on opposite sides of the wheel and capable of oscillatory movement in planes parallel to the plane of rotation of the wheel, a carriage frame secured to the links below their points of suspension, and means for maintaining the axes of suspension of the links at a slight inclination to a vertical transverse plane through the rotation axis of the wheel.

14. In a tractor of the character described, a driving wheel, an axle therefor, links freely suspended from the opposite ends of the axle and capable of oscillatory movement in planes parallel to the plane of rotation of the wheel, a carriage frame secured to the links at points below their points of suspension, means for maintaining the axes of suspension of the links at a slight inclination to a vertical transverse plane through the rotation axis of the wheel, and means for varying the degree of the angle of said inclination.

15. In a tractor of the character described, a driving wheel, a carriage frame freely suspended therefrom, said carriage frame being capable of a horizontal rotary movement in a plane above its lowest point of support, the driving wheel oscillating conjointly with said carriage frame in a horizontal plane.

16. In a tractor of the character described, a driving wheel, a carriage frame encompassing the wheel and suspended freely therefrom, said carriage frame being capable of a horizontal rotary movement in a plane located in the region of the rotation axis of the wheel and above the lowest point of support of the frame, the driving wheel oscillating conjointly with the carriage frame in a horizontal plane.

17. In a tractor of the character described, a driving wheel, an axle therefor, links suspended freely from the opposite ends of the axle, a carriage frame encompassing the wheel and secured to the links at points below the axle, and suitable tension members on opposite sides of the wheel interposed between the axle and the frame, said members being disposed substantially parallel to the plane of rotation of the wheel.

18. In a tractor of the character described, a driving wheel, an axle therefor, links suspended freely from the opposite ends of the axle, a carriage frame encompassing the wheel and secured to the links at points below the axle, suitable tension members on opposite sides of, and parallel to the rotation plane of the wheel interposed between the axle and carriage frame, and means for adjusting the length of said members.

19. In a tractor of the character described, a rotary carriage frame, a driving wheel and axle therefor within the frame, an endless drive-chain for the wheel operating in a plane substantially parallel to the plane of rotation of the wheel, links suspended from the axle on opposite sides of the wheel and yieldingly coupled to the carriage frame at points below and forward of the axis of rotation of the wheel, and means on the carriage for adjusting the position of the wheel in the general plane of its rotation to take up the slack of the drive chain.

20. In a tractor of the character described, a combined driving and steering wheel, an axle therefor, and a carriage loosely suspened from said axle and having its lowest points of support diagonally below the rotation axis of the wheel.

21. In a tractor of the character described, a driving wheel, an axle therefor, links suspended freely from the opposite ends of the axle, a carriage frame encompassing the wheel and secured to the links at points below the axle, suitable tension members interposed between the axle and the rear of the carriage frame for maintaining the frame in a desired position, and means for adjusting the length of said members and thereby shifting the driving wheel relatively to the points of attachment of the carriage frame to the links aforesaid.

22. In a tractor of the character described, a driving wheel, an axle therefor, links suspended freely from the axle on opposite sides of the wheel, a carriage frame encompassing the wheel and secured to the links at points below the axle, suitable longitudinally expansible tension members on opposite sides of the wheel interposed between the axle and the adjacent end of the carriage frame for maintaining the frame in a desired position, an endless drive belt or chain leading from the driving wheel and operating in a plane substantially parallel to the tension members aforesaid, and means for adjusting the length of said members and thereby shifting the position of the driving wheel and at the same time removing the slack from the drive belt.

23. In a tractor of the character described, a driving wheel, an axle therefor, links suspended freely from the axle on opposite sides of the wheel, a carriage frame encompassing the wheel and secured to the links at points below the axle, an endless drive belt leading from the wheel and operating in a plane substantially parallel to the plane of rotation of the wheel, and means for shifting the wheel relatively to the points of attachment of the carriage to the links and thereby tightening the drive belt.

24. In a tractor of the character described, a driving wheel, an axle therefor, links suspended freely from the axle on opposite sides of the wheel, a carriage frame encompassing the wheel and secured to the links at points below the axle, suitable tension members on opposite sides of the driving wheel interposed between the axle and adjacent end of the carriage frame, screw links hinged at one end to the carriage frame, the opposite ends traversing the adjacent ends of the tension members, and nuts on the links operating to adjust the lengths of the tension members to any desired degree for maintaining the carriage frame in proper position.

25. In a tractor, a carriage, a driving wheel therefor, means for suspending the carriage from the wheel, a drive belt, and means for shifting the wheel relatively to the point of attachment of the carriage with the suspending means for tightening the belt.

26. In a tractor, a driving wheel, a carriage therefor, an axle for the wheel, links freely depending from the axle, and means for pivotally securing the carriage to the links at points below the rotation axis of the wheel and below the axle.

27. In a tractor, a driving wheel, an axle therefor, a carriage suspended from the axle, and means for maintaining the lowest point of support of the carriage below the axle and to one side of the rotation axis of the wheel.

28. In a tractor, a driving wheel, an axle therefor, links freely suspended from the axle, a carriage, and means for securing the carriage to the links at points below the axle and in a vertical plane disposed to one side of the axis of rotation of the wheel.

29. In a tractor, a draft-frame, a horizontally oscillatable traction wheel carrying the main weight of the tractor located within the draft-frame, the tractor being provided with a driver's seat over the wheel, a rear axle and wheels therefor flexibly connected to the draft-frame, and a platform on the axle serving as a support for the front end of an independent vehicle pivotally mounted on said support, thereby rendering the tractor available for pulling such independent vehicle, and other vehicles in turn coupled thereto.

30. In a tractor, a carriage provided with a frame, a rotatable ring secured thereto, and a driving and steering wheel mounted centrally in said ring, a draft-frame provided with a flanged ring encompassing the carriage ring, a gear ring on the draft-frame ring projecting over the upper edge of the carriage ring, a steering rod on the carriage frame, and a pinion on the rod meshing with the gear ring.

31. In a tractor of the character described, a carriage having an oscillatory movement in a horizontal plane, a driving wheel therefor, a motor disposed on one side of said wheel, a countershaft actuated by said motor, said shaft being disposed at right angles to the plane of rotation of the driving wheel, an interiorly toothed gear ring on the wheel, a pinion meshing with said gear ring, a shaft for the pinion disposed parallel to the countershaft, a sprocket wheel on the pinion shaft on the end adjacent the motor, a sprocket wheel on the countershaft, and a drive chain passing over said sprockets and operating in a plane parallel to the plane of rotation of the wheel.

In testimony whereof we affix our signatures this 14th day of December, 1917.

LOUIS GOODHART.
BERT R. PARROTT.